(12) United States Patent
Lv et al.

(10) Patent No.: US 11,653,302 B2
(45) Date of Patent: May 16, 2023

(54) METHOD AND APPARATUS FOR LOW POWER CHANNEL ACCESS

(71) Applicant: ZTE CORPORATION, Guangdong (CN)

(72) Inventors: Kaiying Lv, Guangdong (CN); Nan Li, Guangdong (CN); Bo Sun, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/923,842

(22) Filed: Jul. 8, 2020

(65) Prior Publication Data

US 2020/0344688 A1    Oct. 29, 2020

Related U.S. Application Data

(63) Continuation of application No. PCT/CN2018/072578, filed on Jan. 15, 2018.

(51) Int. Cl.
*H04W 52/02* (2009.01)
*H04J 3/06* (2006.01)
*H04W 84/18* (2009.01)
*H04W 88/06* (2009.01)

(52) U.S. Cl.
CPC ....... *H04W 52/0229* (2013.01); *H04J 3/0673* (2013.01); *H04J 3/0682* (2013.01); *H04W 52/0206* (2013.01); *H04W 52/0216* (2013.01); *H04W 84/18* (2013.01); *H04W 88/06* (2013.01)

(58) Field of Classification Search
None
See application file for complete search history.

(56) References Cited

U.S. PATENT DOCUMENTS

| 2010/0279745 | A1* | 11/2010 | Westcott | .......... H04W 52/0274 455/574 |
| 2012/0320809 | A1* | 12/2012 | Sturm | ............... H04W 52/0235 370/311 |
| 2014/0112226 | A1* | 4/2014 | Jafarian | ............ H04W 52/0225 370/311 |

(Continued)

FOREIGN PATENT DOCUMENTS

| CN | 104737597 A | 6/2015 |
| CN | 105165074 A | 12/2015 |

(Continued)

*Primary Examiner* — Mariela Vidal Carpio
(74) *Attorney, Agent, or Firm* — Duane Morris LLP

(57) ABSTRACT

Systems, methods and devices for low power channel access using a wake up radio are disclosed herein. In accordance with one exemplary embodiment, a method performed by a communication device includes: receiving a wake up signal at a wake up radio from a communication node at a receipt time, wherein the wake up signal indicates a node active time for a main radio to begin communicating with the communication node; determining a transition time between an initiation time for the main radio and a device active time, wherein the device active time is during the node active time; determining a delay time from the receipt time to the initiation time; initiating the main radio at the initiation time; and communicating with the communication node using the main radio during the device active time.

18 Claims, 9 Drawing Sheets

(56) References Cited

U.S. PATENT DOCUMENTS

| | | | |
|---|---|---|---|
| 2014/0112229 A1* | 4/2014 | Merlin | H04L 5/0055 |
| | | | 370/311 |
| 2014/0198696 A1* | 7/2014 | Li | H04W 52/0229 |
| | | | 370/311 |
| 2015/0071151 A1 | 3/2015 | Bradley et al. | |
| 2016/0198409 A1 | 7/2016 | Chakraborty | |
| 2016/0295511 A1 | 10/2016 | Qi et al. | |
| 2017/0280388 A1* | 9/2017 | Asterjadhi | H04W 88/08 |
| 2018/0113834 A1* | 4/2018 | O'Shea | G06F 13/4282 |
| 2018/0310247 A1* | 10/2018 | Chu | H04W 52/0235 |
| 2019/0075519 A1* | 3/2019 | Li | H04W 52/0229 |
| 2019/0075521 A1* | 3/2019 | Kneckt | H04W 52/0229 |
| 2019/0090193 A1* | 3/2019 | Liu | H04W 52/028 |
| 2019/0098574 A1* | 3/2019 | Huang | H04W 52/0219 |
| 2019/0230591 A1* | 7/2019 | Gan | H04W 52/02 |
| 2020/0037250 A1* | 1/2020 | Kim | H04W 88/08 |
| 2020/0053649 A1* | 2/2020 | Yao | H04W 76/14 |
| 2020/0344695 A1* | 10/2020 | Wang | H04W 52/0274 |
| 2020/0404588 A1* | 12/2020 | Kim | H04W 52/0235 |

FOREIGN PATENT DOCUMENTS

| | | |
|---|---|---|
| CN | 105723780 A | 6/2016 |
| CN | 105763210 A | 7/2016 |
| CN | 107454665 A | 12/2017 |
| EP | 3264674 A1 | 3/2018 |
| WO | 2017172785 A1 | 10/2017 |

\* cited by examiner

METHOD AND APPARATUS FOR LOW POWER CHANNEL ACCESS

TECHNICAL FIELD

The disclosure relates generally to wireless communications and, more particularly, to systems, methods and devices for low power channel access using a wake up radio.

BACKGROUND

In the Internet of things (IoT), a large number of IoT devices may access communication networks in a wired or wireless manner. IoT devices may be utilized in a number of areas, such as intelligent transportation, environmental protection, public security, smart Home, industrial monitoring, personal health, and the like.

In a wireless communication network, such as a wireless local area network (WLAN), wireless communication nodes such as access points and stations can be IoT devices. An access point (AP) is the basic equipment in a wireless LAN that establishes a Basic Service Set (BSS), and a station (STA) typically establishes wireless communications with the AP through a predetermined association or registration procedure, and thereafter communicates with the AP for data transmission. In some embodiments, an AP may also be equivalent to a base station (BS) and a STA be equivalent to a user equipment (UE). In some types of networks such as ad-hoc networks, for example, an AP is typically not present in the network, and STA's can communicate directly with each other and other nodes. Therefore, for both independent BSS (IBSS) and BSS, both STA's and AP's can generally be referred to as wireless communication nodes, or simply communication nodes, herein.

In a WLAN, for example, STAs can be IoT devices such as sensors equipped with wireless communication modules. IoT devices may be battery-powered and installed at locations that may be difficult or expensive to maintain or access on a frequent basis. Thus, it is desirable for such devices to maximize their battery life. To achieve this purpose, when the STA is in the absence of traffic for a certain period of time, the STA may enter a power saving sleep mode and stays in sleep mode until an AP requests communication with the STA. Typically, in resuming communications, the STA and AP may resume communication in the manner previously conducted, such as at the data rate that a STA and AP utilized prior to entering the power saving sleep mode.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while still remaining within the scope of the invention.

In accordance with one exemplary embodiment, a method performed by a communication device includes: receiving a wake up signal at a wake up radio from a communication node at a receipt time, wherein the wake up signal indicates a node active time for a main radio to begin communicating with the communication node; determining a transition time between an initiation time for the main radio and a device active time, wherein the device active time is during the node active time; determining a delay time from the receipt time to the initiation time; initiating the main radio at the initiation time; and communicating with the communication node using the main radio during the device active time.

In another embodiment, a method performed by a communication node includes: sending a wake up signal to a wake up radio of a communication device for receipt at a receipt time, wherein the wake up signal indicates a node active time for a main radio of the communication device to begin communicating with the communication node, wherein the wake up signal configures the communication device to: determine a transition time between an initiation time for the main radio and a device active time, wherein the device active time is during the node active time, determine a delay time from the receipt time to the initiation time, and initiate the main radio at the initiation time; and communicating with the main radio during the node active time.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be rearranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
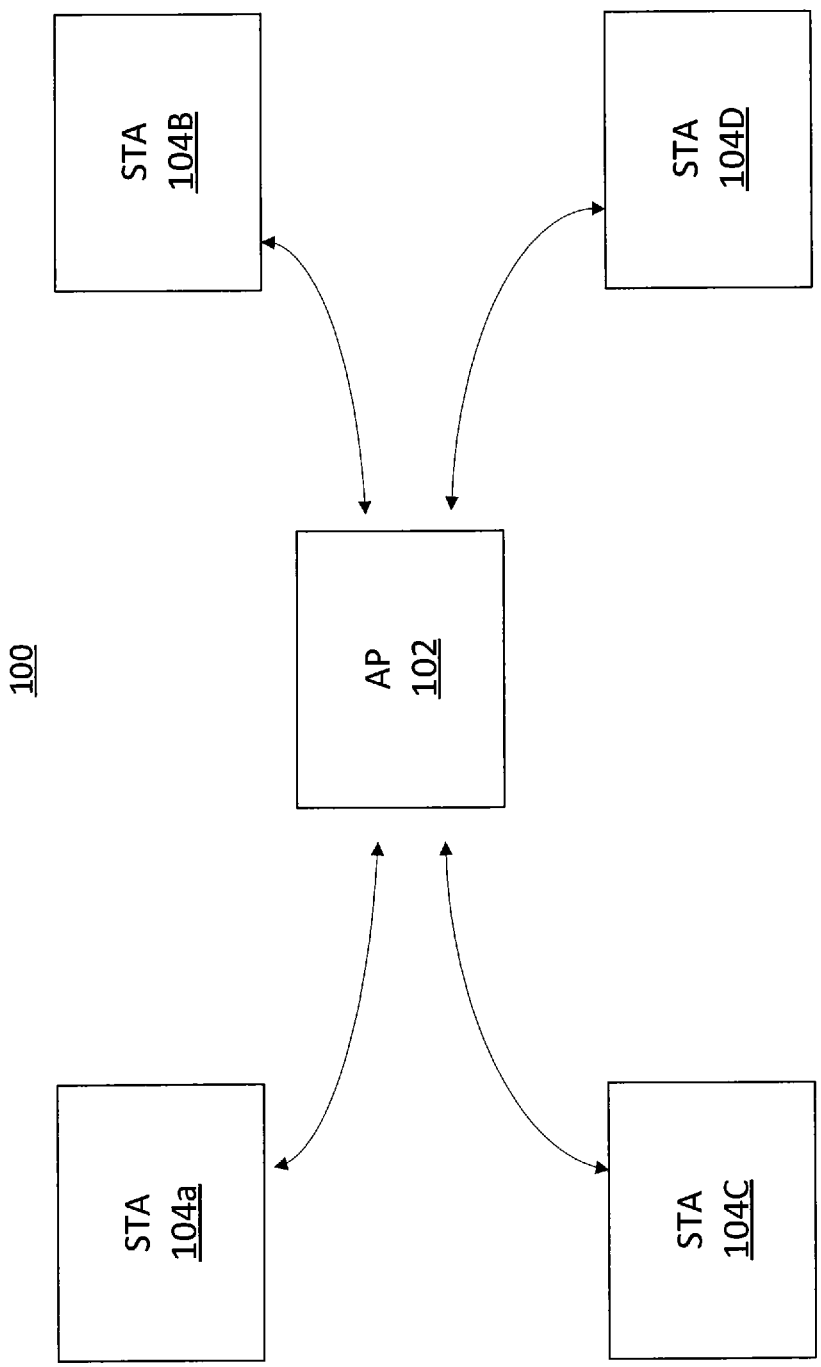
FIG. 1 is a block diagram of an exemplary communication network environment, in accordance with some embodiments of the invention.

FIG. 1 illustrates an exemplary wireless environment in which one or more embodiments of the invention can be practiced. As shown in FIG. 1, a wireless local area network (WLAN) 100 includes at least one access point (AP) 102 and a plurality of stations (STA's) 104a, 104b, 104c and 104d, which are communicatively coupled to the AP 102. Although various aspects of the invention are described herein in the context of a WLAN environment, it is understood that the invention may be practiced in any communication environment in which two or more nodes can communicate with each other when at least one of the nodes is operating in a wake up response mode. Examples of such alternative environments include a wide area network (WAN), metropolitan area network (MAN), local area network (LAN), a neighborhood aware network (NAN), and a personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g., Internet protocol suite, SONET (Synchronous Optical Networking), Ethernet, etc.).

Referring again to the exemplary environment of FIG. 1, a WLAN 100 can be used to interconnect nearby devices employing known networking protocols. However, various embodiments can employ any communication standard to transmit data between two or more nodes. In some embodiments, the AP 102 can serve as a hub or base station for the WLAN 100 and the STA's 104a-104d can be various types of devices capable of operating in a power-saving mode (e.g., a wake up response mode) and having a communication module. For ease of discussion, when referring to any one of STA's 104a-104d, the singular term "STA 104" will be used herein. Examples of STA 104 include devices that include a communication module capable of operating in a power saving mode (e.g., a wake up response mode), and further include any one of various sensors that can measure any operational or environmental parameter (e.g., temperature, pressure, motion, speed, acceleration, ambient light, proximity, voltage, current, image/camera, etc.). In alternative embodiments, the STA 104 can be a laptop computer, a personal digital assistant (PDA), a mobile phone, etc. In certain embodiments, a STA may be referred to generically as a computing device. In some embodiments, the STA 104 can establish a communication link with the AP 102 via a Wi-Fi protocol (e.g., IEEE 802.11 protocol) to obtain connectivity to the Internet or other networks. In some embodiments, the STA 104 can also perform some or all of the functions of the AP 102 and communication with other STA's when employed in an ad-hoc network, for example.

In various embodiments, the AP 102 can include, or be implemented as, a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other communication node configured to perform the synchronization functions described herein. The term "configured for" or "configured to" as used herein with respect to a specified operation or function refers to a device, component, circuit, structure, machine, etc. that is physically constructed, programmed and/or arranged to perform the specified operation or function.

Various processes and methods can be used for transmissions in the wireless communication network 100 between the AP 102 and the STA 104, and between two STA's 104a and 104b, for example. For example, signals can be sent and received in accordance with orthogonal frequency division multiplexing (OFDM)/orthogonal frequency division multiple access (OFDMA) techniques, or code division multiple access (CDMA) techniques.

Figure 2:
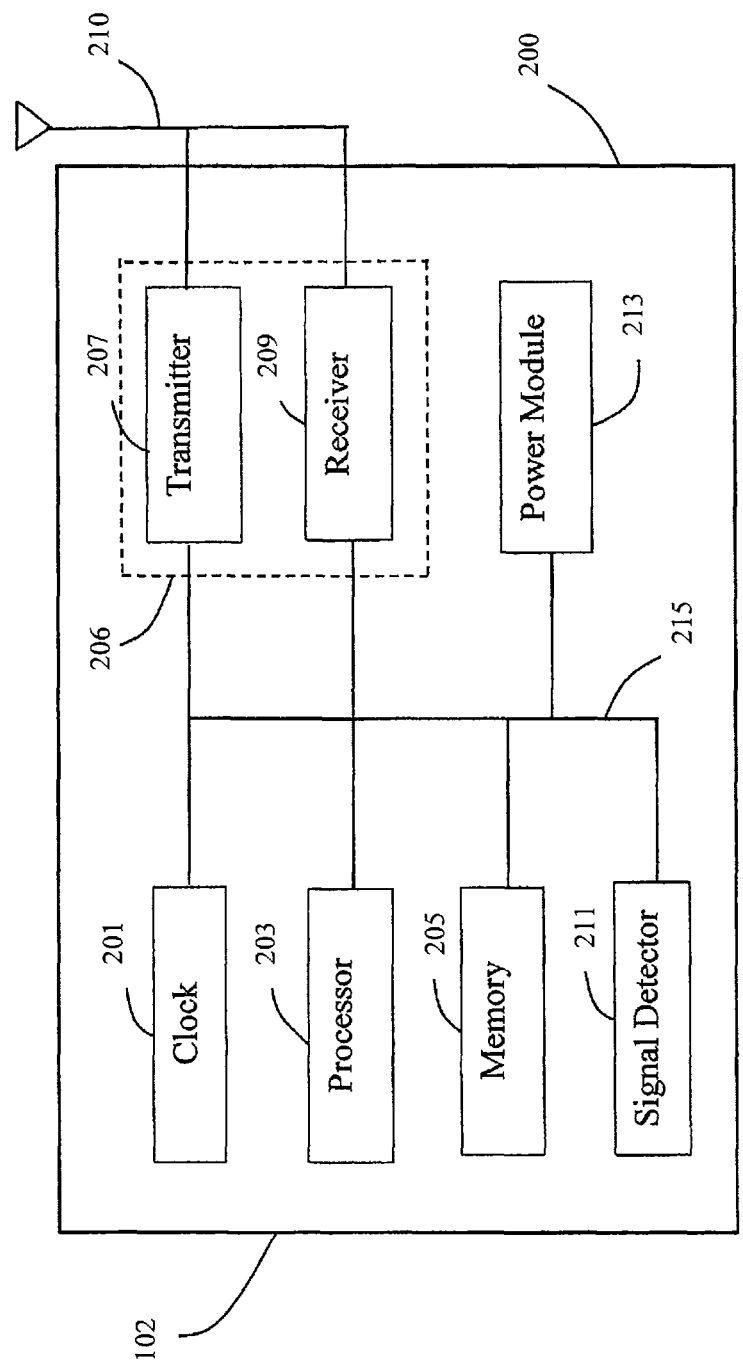
FIG. 2 is a block diagram of an access point (AP), in accordance with some embodiments of the invention.

FIG. 2 illustrates a block diagram of the AP 102, in accordance with some embodiments. The AP 102 is an example of a device that can be configured to implement the various methods described herein. The AP 102 includes a housing 200 containing a system clock 201, a processor 203, a memory 205, a transceiver 206 comprising a transmitter 207 and receiver 209, a signal detector 211, and a power module 213.

The system clock 201 provides the timing signals to the processor 203 for controlling the timing of operations of the AP 102. The processor 203 controls the general operation of the AP 102 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data. As described in further detail below, the processor 203 may control and execute various aspects related to wake up operations, in accordance with various embodiments of the invention.

The memory 205 or data store, which can include both read-only memory (ROM) and random access memory (RAM), can provide instructions and data to the processor 203. A portion of the memory 205 can also include non-volatile random access memory (NVRAM). The processor 203 typically performs logical and arithmetic operations based on program instructions stored within the memory 205. The instructions (a.k.a., software) stored in the memory 205 can be executed by the processor 203 to perform the methods described herein. The processor 203 and memory 205 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 206, which includes the transmitter 207 and receiver 209, allows the AP 102 to transmit and receive data to and from a remote device (e.g, STA 104). An antenna 210 is typically attached to the housing 200 and electrically coupled to the transceiver 206. In various embodiments, the AP 102 include (not shown) multiple transmitters, multiple receivers, multiple transceivers, and/or multiple antennas. The transmitter 207 can be configured to wirelessly transmit packets or frames having different packet or frame types or functions, such packets or frames being generated by the processor 203. Similarly, the receiver 209 is configured to receive packets or frames having different packet or frame types or functions, and the processor 203 is configured to process packets of a plurality of different packet or frame types. For example, the processor 203 can be configured to determine the type of packet or frame and to process the packet or frame and/or fields of the packet or frame accordingly.

In accordance with some embodiments, the AP 102 can also include the signal detector 211, which can be used to detect and quantify the level of signals received by the transceiver 206. The signal detector 211 can detect and quantify such parameters as total energy, energy per sub-carrier per symbol, power spectral density and other signals. The power module 213 can include a power source such as one or more batteries, and a power regulator, to provide regulated power to each of the above-described modules 203, 205, 206 (207 and 209) and 211. In some embodiments, if the AP 102 is coupled to a dedicated external power source (e.g., a wall electrical outlet), the power module 213 can include a transformer and a power regulator.

The various modules discussed above are coupled together by a bus system 215. The bus system 215 can include a data bus and, for example, a power bus, a control signal bus, and/or a status signal bus in addition to the data bus. It is understood that the modules of the AP 102 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 203 can implement not only the functionality described above with respect to the processor 203, but also implement the functionality described above with respect to the signal detector 211. Conversely, each of the modules illustrated in FIG. 2 can be implemented using a plurality of separate components or elements.

Figure 3:
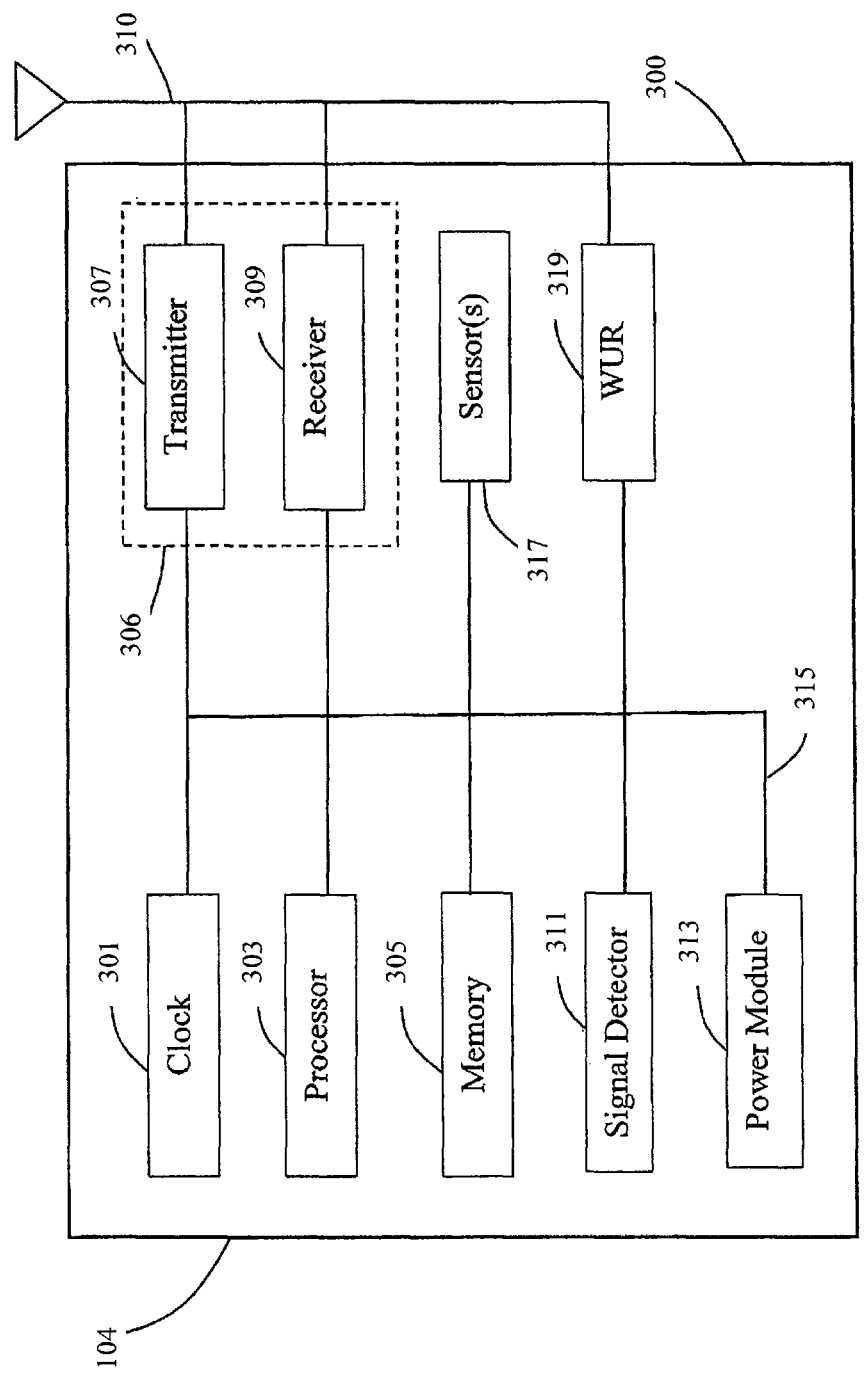
FIG. 3 is a block diagram of a station (STA), in accordance with some embodiments of the invention.

FIG. 3 illustrates a block diagram of the STA 104, in accordance with some embodiments of the invention. As shown in FIG. 3, the STA 104 can include a housing 300, which contains a system clock 301, a processor 303, a memory 305, a transceiver 306 comprising a transmitter 307 and a receiver 309, an antenna 310, a signal detector 311, a power module 313, and a system bus 315. Each of these components or modules can be similar or identical to the respective corresponding components 201, 203, 205, 206, 207, 209, 210, 211, 213 and 215 discussed above with respect to the AP 102 shown in FIG. 2. Therefore, for the sake of brevity, descriptions of these components or modules are not repeated.

As shown in FIG. 3, in accordance with some embodiments, the STA 104 can further include one or more sensors 317 and a wake up receiver or radio (WUR) 319, which are operatively coupled to one another and the other modules discussed above via the system bus 315. The one or more sensors 317 can include any desired sensor for sensing any one or more desired operational or environmental parameters such as pressure, temperature, moisture, speed, acceleration, distance traveled, power, voltage, current, etc. Upon sensing such operational or environmental parameters, the STA 104 can communicate measured operational or environmental parameter values to the AP 102, which can then relay them via the Internet, for example, to a central server or system for further processing and or action based on the measured operational or environmental parameter values. In this way, the STA 104 can be one of a multitude of devices or nodes that can be coupled to one another and/or a central server or system via the Internet to implement an IoT application, as discussed above.

The WUR 319 is an additional receiver besides the main receiver 309, whose task is to wake up the main transceiver 306, and any other modules such as modules 303, 305, 311, 313, 317, shown in FIG. 3 that may be asleep in sleep mode, when there is a request (e.g., in response to a wake up signal) for communication from another node (e.g., AP 102) in the wireless network 100. In certain embodiments, the WUR may be referred to as part of an assistant wireless module. The WUR 319 is coupled to the antenna 310 separate from the main wireless module (e.g., transceiver 306) to monitor for wake up signals from another node (e.g., AP 102). When certain predefined conditions are satisfied, such as when the STA 104 is in the absence of traffic for a certain period of time, the STA may initiate a procedure to negotiate power saving mode parameters with the AP (e.g., for wake up operations). Then the STA may enter the power saving or sleep mode by turning off its main radio (e.g., transceiver 306 and other modules as discussed above) and turning on its WUR 319. The STA may be waked up by the AP's 102 wake up signal if any data transmission is needed through the main radio (e.g., transceiver 306 and other modules as discussed above).

In certain embodiments, the WUR 319 may periodically wake up during a predetermined period of time (i.e., defined by a wake up window) to check for a signal transmitted by the AP 102 during pre-negotiated wake up windows. Thus, the WUR 319 allows the main transceiver 306 and some or all of the other modules 303, 305, 311, 313, 317, (e.g., the main radio) to stay in a sleep mode (e.g., powered down, sleep, or reduced power mode, to contrast with an active, awake, nominally, or fully powered mode) when the STA 104 is idle (e.g., does not need to transmit or receive data to or from another node).

Additionally, the WUR 319 requires less power than the main transceiver 306 when they are performing their respective operations. In this way, the WUR 319 enables conservation of power expended by the STA 104. To further conserve power and/or prolong battery life, if the power module 313 comprises a battery power source, the WUR 319 can operate in a duty cycle power-saving mode, as described above.

As discussed above, two or more nodes of a network (e.g., a STA and AP) can employ a WUR in order to conserve power (e.g., battery power). In certain embodiments, the nodes can periodically wake from a sleep mode to periodically transmit and/or receive synchronization messages, discovery messages, wake up signals, and the like. The WUR may be deployed at a STA and may reduce power consumption when the STA is in a standby (e.g., sleep) mode, where no information is transmitted or received from the STA. The WUR may be an independent companion radio to a main, or primary, radio (e.g., the transceiver 306) of a STA and may expend less power to operate relative to the main, or primary, radio. Accordingly, during the sleep mode, the WLAN device may power off its main radio and enable a WUR to wait for a wake up order (e.g., wake up signal) from an access point (AP). The wake up signal may be transmitted as a wake up packet or a wake up frame. After the wake up packet or frame from the AP is received, the STA will turn on the main radio (e.g., begin the process of turning on the main radio) to begin communicating with the AP.

Figure 4:
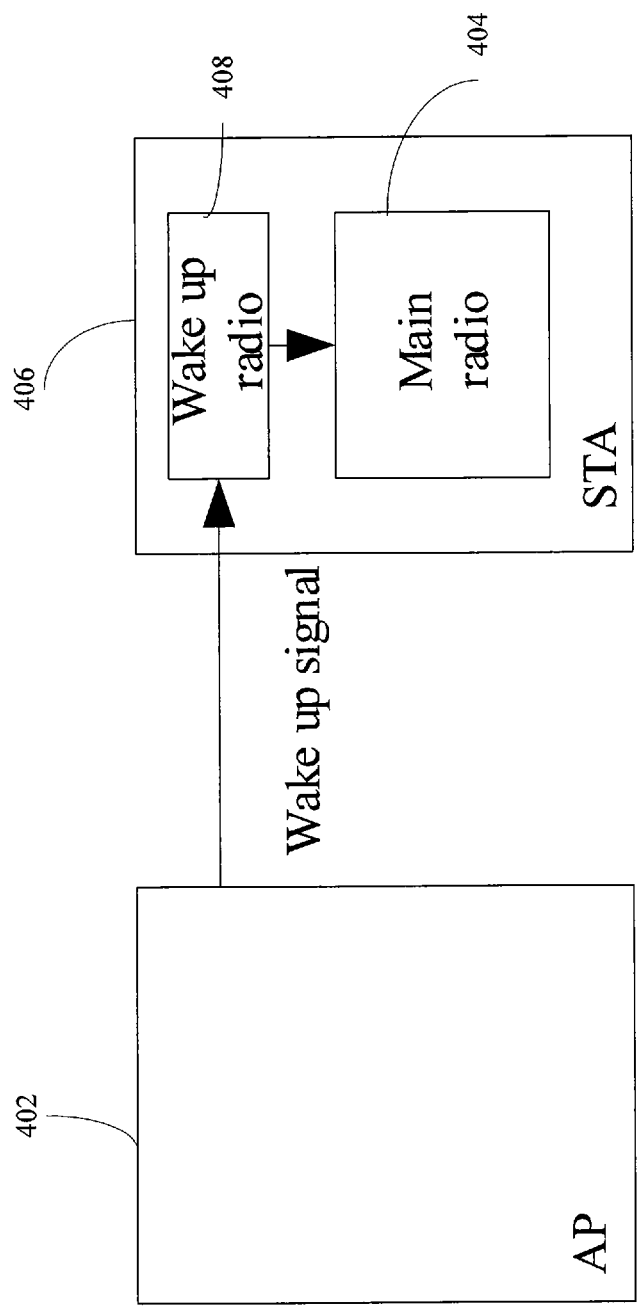
FIG. 4 is a block diagram illustrating how an AP may wake up a main radio, in accordance with some embodiments of the invention.

FIG. 4 is a block diagram illustrating how an AP 402 may wake up a main radio 404, in accordance with some embodiments of the invention. As noted above with reference to FIG. 3, a main radio may refer to a transceiver 306 and other modules of a STA 104 that stay in a sleep mode (e.g., powered down or reduced power mode), in situations such as when the STA 104 is idle (e.g., does not need to transmit or receive data to or from another node). Returning to FIG. 4, the main radio 404 may be part of a STA 406 that is in sleep mode (e.g., powered down or reduced power mode) pending activation by the wake up radio 408 of the STA 406 (e.g., receipt of a wake up signal). Stated another way, the STA 406 will be woken up (e.g., main radio will emerge from sleep mode) by the AP's 402 wake up signal, allowing for data transmission or communication using the main radio 404.

Although various aspects of the invention are described herein in the context of a WLAN environment, it is understood that the invention may be practiced in any communication environment in which two or more nodes can communicate with each other when a node has both a main radio (e.g., main wireless module) and a WUR (e.g., assistant wireless module). The assistant wireless module may include a WUR for receiving, decoding, information processing and triggering functions, as discussed further below. Furthermore, the assistant wireless module may have control functions to assist the main wireless module for applying controlling and managing functions, as discussed further below.

As introduced above, a STA may include a WUR to monitor a wake up channel for a wake up signal. In response to receiving the wake up signal, the STA (e.g., using the WUR) may activate its main radio on demand for communications. The main radio may be turned off when the WUR is on so that power consumption could be minimized. Multiple nodes with low power WURs could be signaled to wake up simultaneously. For example, an AP may buffer data (e.g., store data) for multiple sleeping nodes or STAs that support receiving wake up signals through respective WURs. The AP may transmit a single wake up signal to wake up these sleeping nodes or STAs. However these sleeping nodes may delay with different times to turn on their main radio to get ready for transmission or reception due to device performance differences. Therefore, the AP cannot send a multi-STA transmission until a maximum time that the slowest STA gets ready for reception. Stated another way, the response time after wake up for all STAs of a multi-STA transmission may be limited by the slowest wake up time of the constituent STAs of the multi-STA transmission. Also, already active STAs (e.g., with their main radios already woken up or active) may need to keep their main radios active and inefficiently consume power until the STA with the slowest wake up time has activated its main radio.

Accordingly, systems and methods in accordance with various embodiments include communication nodes that utilize a wake up signal to coordinate a future time for communication between an AP and a sleeping STA, taking into consideration the transition time required for a main radio to boot up or wake up. For example, a STA may receive a wake up signal at a wake up radio from an AP at a receipt time. The wake up signal may indicate an AP active time for a main radio of the STA to begin communication with the AP. In certain embodiments, the time between the receipt time and the AP active time may be referred to as an overall delay time. The STA may then determine a transition time between an initiation time for the main radio and the STA active time for the particular STA. In certain embodiments, an STA active time for a particular STA may be within an AP active time as indicated by an AP from a wake up signal. The initiation time may be the time at which a main radio is initiated, or the wake up process of the main radio is to begin. The transition time may be determined based on the specifications of the particular STA. For example, certain main radios (e.g., main radio configurations, or constituent modules that make up a sleeping main radio, as discussed above) may have a longer transition time (e.g., take longer to start or boot up) than other main radios. The STA may also determine a STA delay time from the receipt time to the initiation time. The STA delay time may refer to an amount of time that the STA may locally delay, or let elapse, between the receipt time and the initiation time. Accordingly, the STA delay time differs from the overall delay time in that the STA delay time is specific for a particular STA, while the overall delay time is the same for all recipient STAs. In certain embodiments, this STA delay time may be a set value, based on the difference between the overall delay time and the transition time. In other embodiments, this STA delay time may be variable when the AP active time as indicated by an AP is also variable (e.g., across a window of time). In particular embodiments, when the STA delay time may be variable, the STA delay time may be chosen at random. Certain embodiments in which the AP active time is variably across a window of time may be referred to as part of a contention based channel access mode. Also, certain embodiments in which the AP active time is a single point in time may be utilized in a trigger based channel access mode. Accordingly, the main radio may be initiated at the initiation time (e.g., after the STA delay time) to communicate with the AP by or during the AP active time, as indicated by the AP.

In various embodiments, the AP and STA may initially coordinate the various times (e.g., parameters of the wake up signal) prior to the STA becoming idle and/or entering into a sleep mode for the main radio. This coordination may be performed across the main radios of both the STA and the AP (to contrast with communicating a wake up signal from an AP's main radio to a WUR of a STA). For example, the STA may inform the AP of the transition time for the STA so that the AP may properly send a wake up signal for an overall delay time that accommodates (e.g., is at or greater than) a recipient STA's transition time.

In particular embodiments, the wake up signal may include wake up information, such as an indicator of the overall delay time, starting from the receipt time. In certain embodiments, this overall delay time may take into consideration an AP active time that is a window of time (e.g., where the overall delay time may end across a window of time). In particular embodiments, this overall delay time may take into consideration an AP active time that is a point in time (e.g., where the overall delay time may end at a point in time). Other wake up information may also be included in the wake up signal, such as a STA delay time, AP active time, receipt time, initiation time, and/or a transition time. Stated another way, an associated STA supporting wake up operations may indicate to its associated AP through its main radio its wake up operation capabilities, including at least: a transition time from sleep mode to awake mode (e.g., from initiation time to STA active time, which would be within an AP active time) when the STA cannot transmit or receive signals through its main radio (due to the main radio being in a temporally inactive state, otherwise referred to as a sleep, doze, inactive, low power or idle mode); supported wake up signal response mode (e.g., contention based channel access mode or trigger based channel access mode or both); supported operating class for a WUR operation channel (e.g., multicast or unicast wake up signal support), and the like.

In some embodiments, the overall delay time may be predefined (e.g., prior communicated between the STA and the AP) such that the STA may already know (e.g., have stored in a data store accessible to the STA) the overall delay time. For example, a look up identifier for the overall delay time may be extracted from the wake up signal so that the actual value of the overall delay time may be retrieved from a data store accessible to the STA. This may contrast with other embodiments in which the overall delay time may be identified directly in, and extracted from, the wake up signal. Although the overall delay time is specifically used as an example of wake up information that may or may not be carried in a wake up signal, other types of wake up information may also be similarly treated as desired for different applications in various embodiments. For example, any of a STA delay time, initiation time, transition time, STA active time, AP active time, and the like may also be similarly treated as the overall delay time in the manner discussed above.

In typical BSS implementations, the AP may set up one or more wake up channels to send one or more wake up signals to wake up non-AP STAs. The term "non-AP STAs" may refer to STAs in, or about to go into, a sleep mode (e.g., in which they have turned off their main radio and are monitoring wake up signals). If a non-AP STA receives a wake up signal intended for it, the non-AP STA may turn on its main radio and perform channel access through main radio by using a contention based channel access mode or by being triggered by the AP (e.g., a trigger based channel access mode), as will be discussed further below.

In certain embodiments, an AP supporting wake up operations (e.g., for a particular wake up response mode) may own (e.g., operate) one or more wake up channels. The AP may also negotiate (e.g., coordinate), with a non-AP STA, resultant actions from information conveyed in a wake up channel. The wake up channel may be used by the AP to send wake up signals (e.g., frames) to the STA.

The AP may send a unicast or multicast wake up signal to the non-AP STA(s) which is (are) in the sleep mode with a WUR monitoring the wake up channel Multiple unicast or multicast wake up signals for different non-AP STAs may be sent simultaneously on the corresponding wake up channels.

As will be discussed further below, in certain embodiments an AP may indicate wake up information. This wake up information may be indicated in a signal on a wake up channel sent to a STA's WUR or as communicated prior to a STA entering sleep mode. This signal communicated prior to a STA entering sleep mode may be sent (e.g., broadcast) via a main radio of the AP. In certain embodiments, the wake up information may be unicasted when negotiating parameters of operations associated with a wake up response mode (e.g., contention or trigger based channel access modes) with a non-AP STA via the AP's main radio. In particular embodiments, wake up information may be carried in wake up signals (e.g., frames). These wake up signals (e.g., frames) may include a field that, when set to true, may instruct a STA to apply the wake up information carried in the received wake up signals (e.g., frames) to the STA in performing wake up operations in a wake up response mode. The AP may also indicate a particular wake up response mode in a wake up signal (e.g., frame). For example, the wake up response mode may be either a trigger based channel access mode or a contention based channel access mode, as will be discussed further below.

In particular embodiments for the trigger based channel access mode, a recipient of the wake up signal (e.g., frame) may execute a specific delay time after receiving a wake up signal on the wake up channel. Accordingly, the recipient of the wake up signal (e.g., frame) may turn on its main radio to receive a trigger signal on a primary connection channel (which may be different than the wake up channel on which a wake up signal is sent or received). In certain embodiments for the contention based response mode, a recipient of a wake up signal (e.g., frame) may execute a delay time that is randomly selected so that the main radio of the STA may wake up (e.g., be active) within a specific window of time (e.g., within a wake up delay window). After waking up, the STA may send a response signal in accordance with a contention based channel access mode.

Accordingly, a STA receiving a wake up signal dedicated to it may turn on its main radio based on wake up information. The specific delay time at the STA (e.g., STA delay time) could be a specific delay time value or a delay time value randomly chosen within a range, as based upon the specific type of response mode (e.g., contention or trigger based channel access modes). Advantageously, such wake up operations performed in a wake up response mode as discussed herein may support a power saving mode that saves power at a STA to wake up with higher power efficiency.

Figure 5:
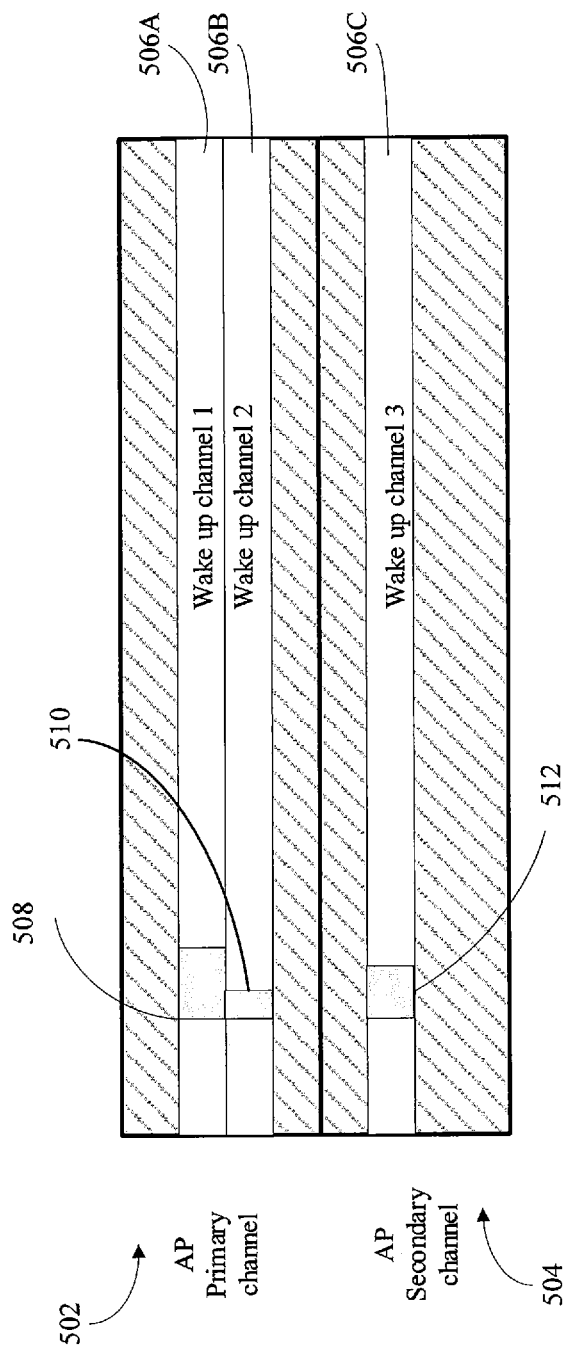
FIG. 5 illustrates how a wake up signal may be sent on one or more wake up channels, in accordance with some embodiments of the invention.

FIG. 5 illustrates how a wake up signal may be sent on one or more wake up channels, in accordance with some embodiments of the invention. An AP may operate across multiple wake up channels, which may be divisible among primary 502 and secondary 504 channels. The primary channels 502 may include a first wake up channel 506A and a second wake up channel 506B. The secondary channels 504 may include a third wake up channel 506C (with numerals continuing after the first and second wake up channels, for ease of explanation). The first wake up channel 506A may include a multicast wake up signal 508. The second wake up channel 506B may include a unicast wake up signal 510. Also, the third wake up channel 506C may include a unicast wake up signal 512. As indicated, each of the wake up signals may have a different temporal length (e.g., some may be longer while others may be shorter). Their length may depend upon the amount of information within each wake up signal. For example, certain wake up signals may include wake up information, while other wake up signals may be shorter with only a wake up signal indication. Also, a multicast wake up signal may be received and processed by multiple STAs while a unicast wake up signal may be received and processed by a single STA.

A wake up signal may include wake up information, which may be used for indicating an overall delay time for a STA to turn on its main radio and transit from the sleep mode to awake mode after receiving the wake up signal. The overall delay time can be a specific time (e.g., an overall delay time ending at a point in time) or a window of time (e.g., an overall delay time ending across a window of time) or a delay indication for the STA. When it is a specific time, the overall delay time may indicate the delay from the start of the received wake up signal or from the end of the received wake up signal. Stated another way, time may be measured from a receipt time as a start of receipt of the received wake up signal, or at the end of the receipt of the received wake up signal. The duration of the delay time may include at least the transition time from the sleep mode to the awake mode of the STA. When the delay time is a window of time (e.g., across multiple times), the delay time may indicate that the STA may randomly select a STA delay time in accordance with, or so that the STA active time is within or during, an AP active time indicated by a delay window (e.g., starting from the beginning or end of the received wake up signal).

In certain embodiments, an AP may broadcast wake up information. The broadcasted wake up information may be defined based on the transition time of all associated non-AP STAs supporting wake up operations in a wake up response mode (e.g., configured for reception, and wake up in response to, a wake up signal from the AP). In other embodiments, an AP may unicast wake up information. These transmissions (broadcasting or unicasting) from an AP may be performed using the AP's main radio. Also, in some embodiments, these transmissions may be sent to a main radio of a non-AP STA prior to the non-AP STA entering into a sleep mode. In other embodiments these transmissions may be sent to a WUR of a non-AP STA in the sleep mode. Stated another way, the non-AP STAs may receive all of the wake up information via the wake up signal either as part of the wake up signal or as part of the wake up signal in conjunction with prior coordination (e.g., setting of parameters) with the AP. In particular embodiments, the wake up information may take into consideration the transition time of all of or a set group of non AP-STAs. For example, the wake up information may include an overall delay time longer than the transition time of any particular non AP-STA configured to receive the wake up information.

In certain embodiments, the wake up signal may include a wake up response mode indication. The wake up response mode indication may indicate whether the STA should engage in a contention based channel access mode or passive response by a trigger based channel access mode.

In certain embodiments, a contention based channel access mode may refer to contention on a channel by the non-AP STAs with channel clear assessment and random backoff access through a STA's main radio after receiving a wake up signal. The wake up information may indicate an AP active time across a window of time. The STA may randomly select a STA delay time so that the STA's main radio is active within the window of time associated with the AP active time (e.g., so that the STA active time is during the AP active time). Accordingly, the main radio may be awake, or active by the STA active time within the AP active time's window of time for channel access and communication with the AP. Stated another way, after the STA delay time, the STA may turn on its main radio to enter an active or awake mode and access a channel after detecting the channel being idle for a predefined time interval and after its random backoff timer reaches zero.

A trigger based channel access mode may feature an AP active time that is a set point in time, as opposed to an AP active time that is a window of time. The trigger based channel access mode may include a STA waiting for a signal, received form an AP, triggering the STA to send a signal as a response without channel access contention. The wake up information may indicate an absolute time value, such as an overall delay time or STA delay time, in a trigger based channel access mode. Accordingly, at the initiation time, the STA may begin the process of turning on its main radio to enter an active or awake mode prior to the expiration of the overall delay time (e.g., by the AP active time, or so that the STA active time is during the AP active time). Then the STA may wait for the AP to send a signal, for which the STA may respond to without contending the channel after a predefined inter-frame (e.g., signal) space from the end of the AP sent frame. Stated another way, after sending the wake up signal, if the wake up signal indicates the trigger based channel access mode with a wake up overall delay time (e.g., includes an overall delay time), then the AP may send the trigger signal to the STA waked by the wake up signal at or after the time indicated in the wake up signal (e.g., at or after the AP active time indicated by the overall delay time, or at the expiry or end of the overall delay time).

In certain embodiments, an AP may indicate application of particular wake up information without explicitly indicating a particular wake up response mode. Stated another way, the wake up information included in a wake up signal may be selective (e.g., not all possible wake up information needs be included in a wake up signal). For example, wake up information may indicate only an overall delay time in a unicast signal. Also, as another example, wake up information may indicate a wake up delay window (e.g., a window of time for the AP active time in contention or in a contention based channel access mode) when the wake up signal is a multicast signal.

In certain embodiments, an AP may include a wake up delay indication in the wake up signal (e.g., as part of the wake up signal or frame). When the wake up delay indication is set to true, the wake up information signaled through the main radio prior to the STA entering into a sleep mode may be applied. Also, when the wake up response mode is the contention based channel access mode, the wake up delay indication may indicate that a previously communicated window of time signaled through the main radio (e.g., prior to the STA entering into the sleep mode) is to be the AP active time. When the wake up response mode is the trigger based channel access mode, the wake up delay indication may indicate that a previously communicated delay time (e.g., single value of time, and not a window of time) signaled through the main radio is to indicate the AP active time.

In several embodiments, a STA in the sleep mode with a WUR monitoring the wake up channel may receive a wake up signal from an AP associated with the STA (e.g., configured to communicate with the STA via a wake up signal). The wake up signal may in the form of a wake up frame. In certain embodiments, the STA may apply an overall delay time associated with the wake up signal and derived from the wake up signal. For example, in particular embodiments, the STA may apply an overall delay time derived from the received wake up signal with further, or other, wake up information derived from communications prior to the STA entering the sleep mode (e.g., as received by the STA's main radio) via a broadcast or unicast signal.

In certain embodiments, a wake up signal or a wake up signal may include a wake up response mode indication for the contention based channel access mode. As noted above, the contention based channel access mode may include an AP active time that is a window of time. Accordingly, the STA may select a random STA delay time so that the STA may be active (e.g., main radio fully transitioned from sleep mode to active mode) within the window of time. Also, as noted above, an AP active time that is a window of time may be indicated in the wake up information of a received wake up frame or wake up signal. In particular embodiments, the contention based channel access mode may be indicated (e.g., with an AP active time that is a window of time) by an indication of true for a field of the received wake up signal (e.g., frame) that indicates whether the contention based channel access mode is activated. As a corollary, in specific embodiments, the contention based channel access mode may be indicated by an indication of false for a field of the received wake up signal (e.g., frame) that indicates whether the trigger based channel access mode is activated. The actual values for the window of time may be included in other parts of the received wake up signal (e.g., frame), or may be received prior to the STA entering sleep mode (e.g., received via the STA's main radio prior to entering sleep mode and powering down its main radio). These wake up signals (e.g., frames) may be received as a multicast or unicast signal (e.g., frame). Based on the noted AP active time, the STA may initiate the main radio at an appropriate initiation time so that the main radio is active by the AP active time (e.g., so that the STA active time is during the AP active time). Once active at or during the active time, the main radio may start channel access through the main radio via contention.

In certain embodiments, a wake up signal or a wake up frame may include a wake up response mode indication for a trigger based channel access mode. The trigger based channel access mode may include having a STA ensure that the STA has its main radio transitioned from a sleep mode to an active or awake mode or state at or before the AP active time. The AP active time may be a particular point in time (in contrast to a window of time in the contention based channel access mode). In particular embodiments, the trigger based channel access mode may be indicated by an indication of true for a field of the received wake up signal (e.g., frame) that indicates whether the trigger based channel access mode is activated. As a corollary, in specific embodiments, the trigger based channel access mode may be indicated by an indication of false for a field of the received wake up signal (e.g., frame) that indicates whether the contention based channel access mode is activated. The actual values for the AP active time may be included in other parts of the received wake up signal (e.g., frame), or may be received prior to the STA entering sleep mode (e.g., received via the STA's main radio prior to entering sleep mode and powering down its main radio). These wake up signals (e.g., frames) may be received as a multicast or unicast signal (e.g., frame). Based on the noted AP active time, the STA may initiate the main radio at an appropriate initiation time so that the main radio is active by the active time (e.g., so that the STA active time is during the AP active time).

In numerous embodiments, the contention based channel access mode may differ from the trigger based channel access mode in that a STA contends with other STAs to send a signal to the AP at the window of AP active time via the main radio during the contention based channel access mode. Accordingly, each STA may randomly choose a STA delay time to decrease the chance of the multiple STAs communicating with the AP at a same time. In contrast, for the trigger based channel access mode, a STA may more simply have its main radio be active, or powered up, by the AP active time so that the AP may subsequently send a signal to the STA's main radio.

Figure 6:
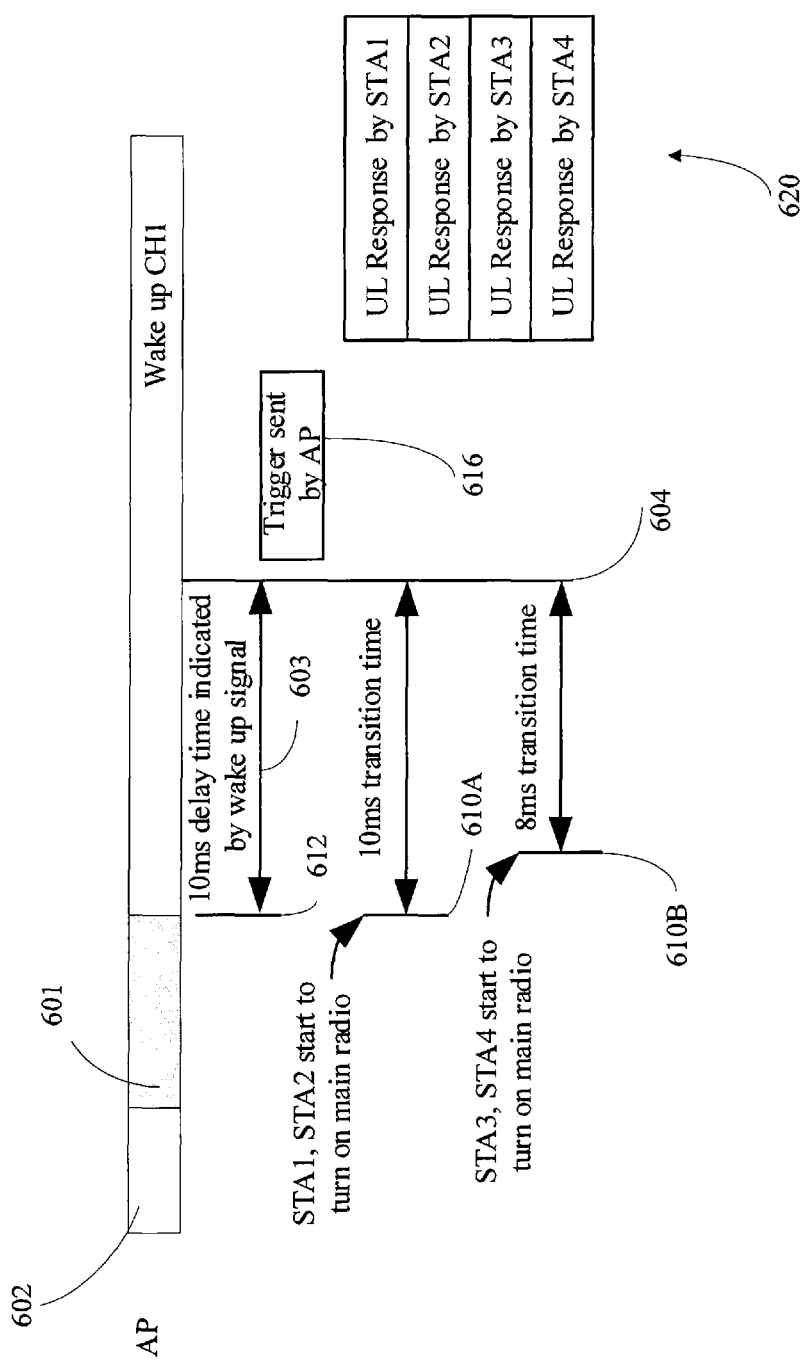
FIG. 6 illustrates how multiple STAs may receive a single multicast wake up signal, in accordance with some embodiments of the invention.

FIG. 6 illustrates how multiple STAs may receive a single multicast wake up signal 601, in accordance with some embodiments of the invention. A single AP may set up a BSS with four non-AP STAs (STA1, STA2, STA3, STA4). Both the AP and non-AP STAs may support wake up operations in a wake up response mode (e.g., be configured to communicate, and respond in accordance with, a wake up signal). The AP may set up one wake up channel (CH1) 602. All four STAs may monitor on CH1 in sleep mode (e.g., a doze mode). The sleep mode, or doze mode, may contrast with an awake or active mode (e.g., an awake state) when the STAs may communicate with the AP through their respective main radios. Also, via the main radios, the STAs may communicate with the AP via primary connection channels. The CH1 602 may be within or without the bandwidth of the primary connection channels.

The non-AP STAs may associate with the AP and negotiate with the AP concerning their wake up operation capabilities (e.g., for a particular wake up response mode) through the primary connection channels. The wake up operation capabilities may include at least the following: executing a transition time from sleep mode to awake mode (e.g., between an initiation time and STA active time) after receiving a wake up signal; supported wake up signal response mode (e.g., the contention based channel access mode or the trigger based channel access mode or both); supported operating class for the wake up channel; multicast wake up signal support, and the like.

Each STA may have a different transition time from a sleep mode to an awake mode (e.g., from an initiation time to an STA active time). For example, STA1 and STA2 may have a transition time of 10 ms while STA3 and STA4 may have a transition time of 8 ms.

In certain embodiments, a non-AP STAs (e.g., any of STA1-STA4) may request to enter a wake up response mode and enter the sleep mode respectively. Stated another way, a STA may notify an AP of the STA's imminent entry into a sleep mode (e.g., by sending a sleep request signal to the AP) so that the AP may wake up the STA using a wake up signal.

The AP may store or buffer data for each STA in the sleep state. This data may include associated wake up information, such as a transition time for each STA or an indication that a particular STA is in a sleep state. Then, the AP may send a multicast wake up signal (e.g., frame) 601 to the four STAs. The multicast signal 601 may include a group identifier which identifies the four STAs as the dedicated STAs to be woken up (e.g., to undergo wake up operations as part of a wake up response mode). The multicast signal 601 may also include a wake up response mode indication which indicates a trigger based channel access mode to be implemented at each of the STAs.

Within the multicast wake up signal 601 for STA1, STA2, STA3, and STA4, the AP may set a field corresponding to a overall delay time 603 to 10 ms, or a delay level which corresponds to 10 ms. This may ensure that all four STAs can be awake (e.g., in the awake state or mode) at or before the AP active time 604 (e.g., 10 ms after the end of the wake up signal (e.g., frame)).

As noted above, STA1 and STA2 may have transition time of 10 ms. Thus, they may turn on their main radio (e.g., execute an initiation time 610A) right after receiving the wake up signal. STA3 and STA4 have transition time of 8 ms. Thus, they may delay for a maximum of 2 ms to turn on their main radio after receiving the wake up signal (e.g., after receipt time 612). Stated another way, STA3 and STA4 may implement a STA delay time of up to 2 ms before executing an initiation time due to the transition time of STA3 and STA4 being less than the 10 ms overall delay time 603.

After sending the wake up signal, the AP may contends on the primary connection channel at least 10 ms later (e.g., at or after the AP active time) to send the trigger signal 616 to solicit all four STAs to send a response signal 620. Stated another way, the AP may send the trigger signal 616 at or after the AP active time 604 (which is also the STA active time). Each of the STAs may send a response signal 620 in response to receipt of the trigger signal 616. In certain embodiments, the response signal may be sent through an uplink multi-user transmission (e.g., Uplink Orthogonal Frequency Division Multiple Access (UL-OFDMA).

Figure 7:
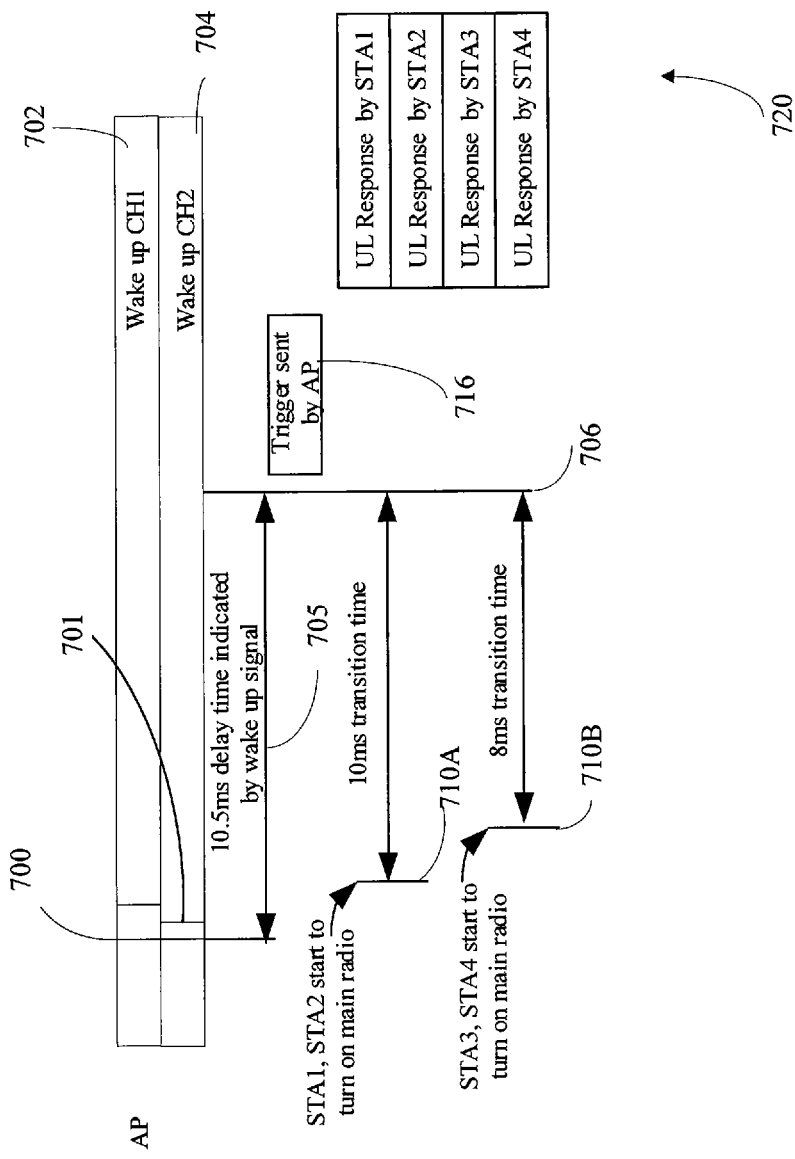
FIG. 7 illustrates how multiple STAs may receive a multicast and a unicast wake up signal across multiple wake up channels, in accordance with some embodiments of the invention.

FIG. 7 illustrates how multiple STAs may receive a multicast wake up signal 700 and a unicast wake up signal 701 across multiple channels, in accordance with some embodiments of the invention. One AP may set up a BSS with four non-AP STAs (STA1, STA2, STA3, STA4). Both the AP and non-AP STAs may support wake up operations for a wake up response mode, as introduced above. The AP may set up two wake up channels (CH1 702 and CH2 704). STA1, STA2, and STA3 may monitor on CH1 702 while in a sleep mode. STA4 may monitor on CH2 704 in a sleep mode. The sleep mode, may contrast with an awake or active mode (e.g., an awake mode) when the STAs may communicate with the AP through their respective main radios. Also, via the main radios, the STAs may communicate with the AP via primary connection channels. CH1 702 and CH2 704 may be within or without the bandwidth of the primary connection channels.

Different STAs may have different transition time from a sleep mode to an awake state. For example, STA1 and STA2 have a transition time of 10 ms. STA3 and STA4 may have a transition time of 8 ms.

The AP may store or buffer data for each STA in the sleep state. This data may include associated wake up information, such as a transition time for each STA or an indication that a particular STA is in a sleep state. The AP may also send a multicast wake up signal (e.g., frame) 700 to STA1, STA2, and STA3. The AP may also send a unicast wake up signal (e.g., frame) 701 to STA4. The multicast signal (e.g., frame) 700 may include a group identifier which identifies the STA1-STA3 as among the dedicated STAs to be woken up (e.g., to undergo wake up operations in a wake up response mode). Also, the unicast signal (e.g., frame) 701 may include an identifier of STA4 as among the dedicated STAs to be woken up. The multicast signal 700 and unicast signal 701 may also include a wake up response mode indication which indicates a trigger based channel access mode to be implemented at each of the STAs.

Within the multicast wake up signal 700 for STA1, STA2, and STA3, the AP may set a field corresponding to an overall delay time 705 of 10.5 ms, or a delay level which corresponds to 10.5 ms. Within the unicast wakeup signal 701 for STA4, the AP may set a field corresponding to an overall delay time 705 of 10.5 ms, or a delay level corresponding to 10.5 ms. This may ensure that all four STAs can be awake (e.g., in the awake state or mode) at or before the AP active time 706 (e.g., 10.5 ms after the start of the respective wake up signals, whether multicast or unicast). The overall delay time 705 of 10.5 ms takes into account that the duration of both the multicast wake up signal 700 and unicast wake up signal 701 is less than 0.5 ms. Stated another way, the overall delay time 705 adds an additional 0.5 over the longest transition time of the STAs (e.g., 10 ms) to allow time for the wake up signal (e.g., frame) to finish transmitting before a respective initiation time of a STA (e.g., 710A, 710B). The AP can adjust the delay time based on duration of wake up signals and transition time of multiple STAs.

As noted above, STA1 and STA2 may have transition time of 10 ms. Thus, they may turn on their main radio (e.g., execute an initiation time 710A) 10 ms prior to the AP active time 706, which is the endpoint or expiry of the overall delay time 705. STA3 and STA4 have transition time of 8 ms. Thus, they may turn on their main radio (e.g., execute an initiation time 710B) 8 ms prior to the AP active time 706.

After sending the wake up signal, the AP may contends on the primary connection channel at or after the AP active time 706 (e.g., no earlier than the AP active time 706, which is also the STA active time). By contending, the AP may send a trigger signal 616 to solicit all four STAs to send response signal 620. As stated above, the AP active time may also be at the endpoint or expiry of the overall delay time 705.

Figure 8:
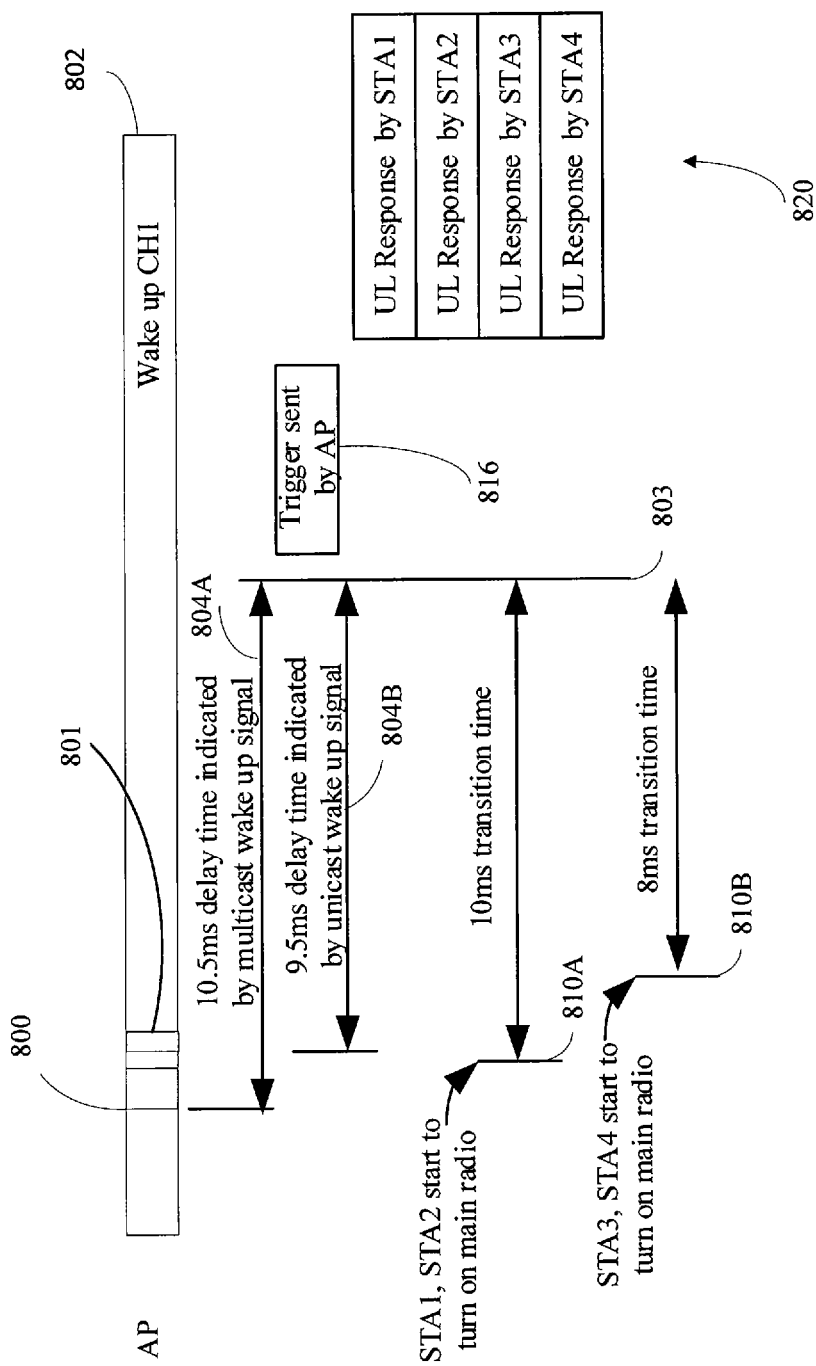
FIG. 8 illustrates how multiple STAs may receive a multicast and a unicast wake up signal across a single wake up channel, in accordance with some embodiments of the invention.

FIG. 8 illustrates how multiple STAs may receive a multicast wake up signal 800 and a unicast wake up signal 801 across a single channel, in accordance with some embodiments of the invention. A single AP may set up a BSS with four non-AP STAs (STA1, STA2, STA3, STA4). Both the AP and non-AP STAs may support wake up operations in a wake up response mode (e.g., be configured to communicate, and respond in accordance with, a wake up signal). The AP may set up one wake up channel (CH1) 802. All four STAs may monitor on CH1 in sleep mode (e.g., a doze mode). The sleep mode, or doze mode, may contrast with an awake or active mode when the STAs may communicate with the AP through their respective main radios. Also, via the main radios, the STAs may communicate with the AP via primary connection channels. CH1 802 may be within or without the bandwidth of the primary connection channels.

Each STA may have a different transition time from a sleep mode to an awake mode (e.g., from an initiation time to an STA active time, which is also an AP active time 803). For example, STA1 and STA2 may have a transition time of 10 ms while STA3 and STA4 may have a transition time of 8 ms.

The AP may store or buffer data for each STA in the sleep state. This data may include associated wake up information, such as a transition time for each STA or an indication that a particular STA is in a sleep state. The AP may also send a multicast wake up signal (e.g., frame) 800 to STA1, STA2, and STA3 on CH1 802. The AP may also send a unicast wake up signal (e.g., frame) 801 to STA4 after the multicast wake up signal on CH1 802. The multicast signal (e.g., frame) 800 may include a group identifier which identifies the STA1-STA3 as among the dedicated STAs to be woken up (e.g., to undergo wake up operations in a wake up response mode). Also, the unicast signal (e.g., frame) 801 may include an identifier of STA4 as among the dedicated STAs to be woken up. The multicast signal 800 and unicast signal 801 may also include a wake up response mode indication which indicates a trigger based channel access mode to be implemented at each of the STAs.

Within the multicast wake up signal 800 for STA1, STA2, and STA3, the AP may set a field corresponding to an overall delay time 804A of 10.5 ms, or a delay level which corresponds to 10.5 ms. Within the unicast wakeup signal 801 for STA4, the AP may set a field corresponding to an overall delay time 804B of 9.5 ms, or a delay level corresponding to 9.5 ms. The unicast wake up signal 800 for STA4 may be received (e.g., have a receipt time) 1 ms after receipt at STA1-STA3 of the multicast wakeup signal 800. Also, the multicast wake up signal 800 may be 0.5 ms in duration and the unicast wake up signal 801 may be 0.3 ms in duration. This may ensure that all four STAs can be awake (e.g., in the awake state or mode) at or before the AP active time 803 (e.g., 10.5 ms after the start of the multicast wakeup signal). The overall delay time 804A of 10.5 ms takes into account that there is a 1 ms difference in the start times for the multicast wakeup signal 800 and the unicast wakeup signal 801 and for the respective durations of the multicast wake up signal 800 and unicast wakeup signals 801. The AP can adjust the delay time based on duration of wake up signals and transition time of multiple STAs, and the sequence of the wake up signals (e.g., frames).

As noted above, STA1 and STA2 may have transition time of 10 ms. Thus, they may turn on their main radio (e.g., execute an initiation time 810A) 10 ms prior to the AP active time 803, which is the endpoint or expiry of the overall delay time 804A. STA3 and STA4 have transition time of 8 ms. Thus, they may turn on their main radio (e.g., execute an initiation time 810B) 8 ms prior to the AP active time 803. The AP active time 803 may be indicated by a wake up information field of the received wake up signal or frame, such as being the indicated endpoint or expiry of an indicated overall delay time (e.g., 804A, 804B). In certain embodiments, the endpoint may be calculated by the start time of receipt of the wake up signal (e.g., frame), plus the duration of the wake up information indicated included in the wake up signal (e.g., frame).

After sending the wake up signal, the AP may contends on the primary connection channel at or after the AP active time 803 (e.g., no earlier than the AP active time 803). By contending, the AP may send a trigger signal 816 to solicit all four STAs to send response signal 820. As stated above, the AP active time 803 may also be the endpoint or expiry of the overall delay time 804A, 804B.

In various embodiments, one AP may broadcast the wake up information through the AP's main radio. In further embodiments, an AP may negotiate wake up information using both the AP and the STA's main radios when the STA negotiates the wake up response mode with the AP. Stated another way, a STA and AP may communicate parameters related to wake up operations via their respective main radios prior to the STA going into sleep mode. The parameters related to wake up operations may include wake up information based on the transition time from a sleep mode to an awake mode of all non-AP STAs with a WUR or a group of non-AP STAs with WURs. These parameters may take into consideration a maximum transition time among the non-AP STAs.

In certain embodiments, the STAs being waked up by the wake up signal may execute an appropriate STA delay time when an AP indicates a wake up response mode as the trigger based channel access mode in a received wake up signal. This may include turning on a main radio to be in an awake mode before an AP active time, or the endpoint indicated by the wake up information. In certain embodiments, the endpoint indicated by the wake up information may be a window of time, such as in contention based channel access mode.

In particular embodiments, when the AP indicates the wake up response mode as the contention based channel access mode in the wake up signal, the STAs being woken up by the wake up signal may randomly select a STA delay time within the window of time for an AP active time, as indicated by the wake up information. An initiation time may occur when the STA delay time expires. Accordingly, the STAs may begin the process of turning on the main radio and enter awake mode at the initiation time.

In some embodiments, when the AP sets the wake up delay indication to true in the wake up signal, the STAs being woken up by the wake up signal may implement a STA delay before initiating the process of turning on its main radio (e.g., set an initiation time) based on the wake up information and wake up response mode. When the AP sets the wake up delay indication to false in the wake up signal, the STAs being woken up by the wake up signal may turn on the main radio (e.g., set an initiation time) after receiving the wake up signal without considering the wake up information (e.g., without reading any specific wake up information within the wake up signal, aside from an identifier that the signal is a wake up signal for the STA).

Figure 9:
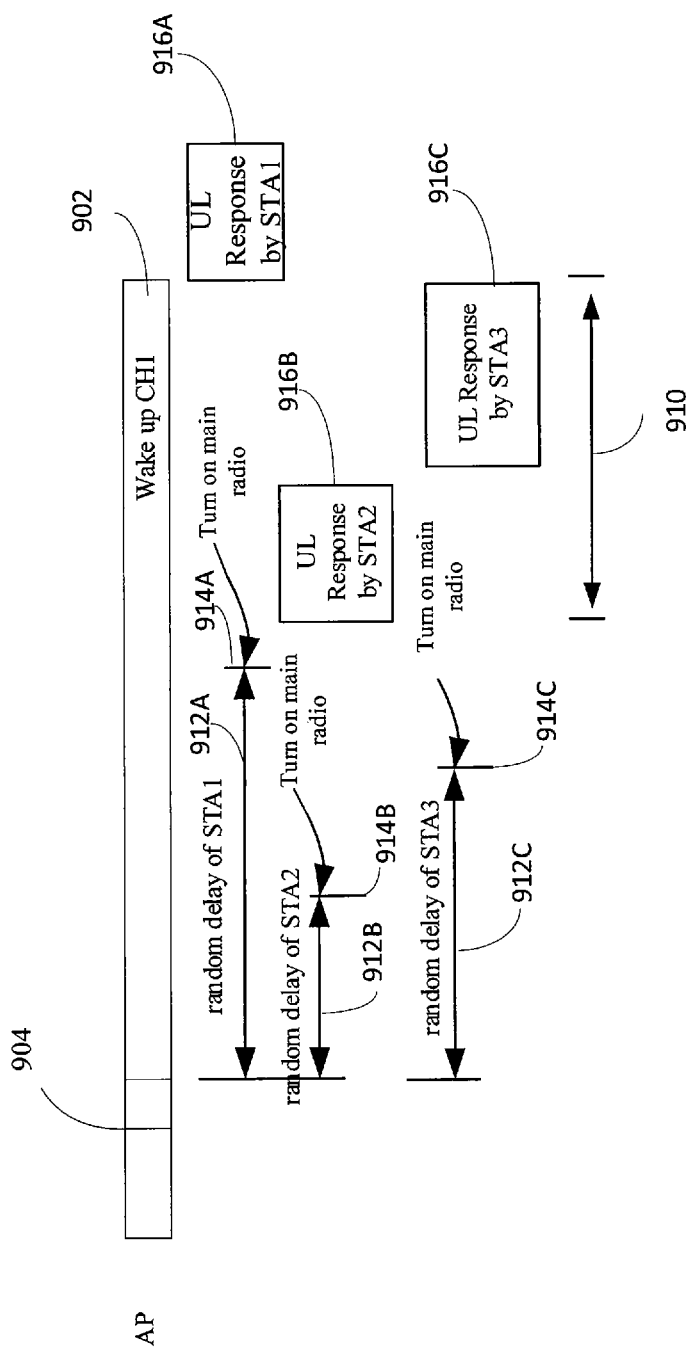
FIG. 9 illustrates a wake up operation with a wake up delay window, in accordance with some embodiments of the invention.

FIG. 9 illustrates a wake up operation in a contention based channel access mode, in accordance with some embodiments of the invention. A single AP may set up a BSS with three non-AP STAs (STA1, STA2, STA3). Both the AP and non-AP STAs may support wake up operations in a wake up response mode (e.g., be configured to communicate, and respond in accordance with, a wake up signal). The AP may set up one wake up channel (CH1) 902. All three STAs may monitor on CH1 in sleep mode (e.g., a doze mode). The sleep mode, or doze mode, may contrast with an awake or active mode (e.g., an awake state) when the STAs may communicate with the AP through their respective main radios. Also, via the main radios, the STAs may communicate with the AP via primary connection channels. The CH1 902 may be within or without the bandwidth of the primary connection channels.

The AP may store or buffer data for each STA in the sleep state. This data may include associated wake up information, such as a transition time for each STA or an indication that a particular STA is in a sleep state. Then, the AP may send a multicast wake up signal (e.g., frame) 904 to the three STAs. The multicast signal may include a group identifier which identifies the three STAs as the STAs to be woken up (e.g., to undergo wake up operations in a wake up response mode). The multicast signal may also include a wake up response mode indication which indicates a contention based channel access mode to be implemented at each of the STAs. The multicast signal may also include wake up information, such as an AP active time as a window of time 910 for the STAs.

In response to receiving the multicast wake up signal, each STA may choose a STA delay time (e.g., 912A, 912B, 912C) at random so that each STA's active time will fall within the AP active time's window of time 910. Accordingly, at the expiration of each respective STA delay time 912A, 912B, 912C, each respective STA may begin the process of turning on its main radio (e.g., at an initiation time 914A, 914B, 914C) so that each STA's active time may fall within the AP active time's window of time 910. Each STA may then perform in accordance with the contention based channel access mode to send its wake up response signal 916A, 916B, 916C after its respective main radio is active.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method comprising:
receiving a wake up signal at a wake up radio from a communication node at a receipt time, wherein the wake up signal indicates a node active time for a plurality of main radios of a plurality of communication devices to begin communicating with the communication node,
wherein each of the plurality of communication devices is configured to:
determine a respective one of each of a plurality of transition times between a respective one of each of a plurality of initiation times and a respective one of each of a plurality of device active times for a respective one of each of the plurality of main radios, wherein the plurality of device active times are during the node active time and at least two transition times of the plurality of transition times are different, wherein the wake up signal comprises an overall delay time from the receipt time to the node active time, wherein the overall delay time is the same for each of the plurality of main radios and indicates a time when each of the plurality of main radios is ready to send uplink data to the communication node, and the overall delay time is greater than or equal to a maximum transition time of the plurality of transition times; and determine a respective one of each of a plurality of
device delay times between the receipt time and each
of the plurality of initiation times, such that a sum of
the respective one of each of the plurality of device
delay times and the respective one of each of the
plurality of transition times is equal to the overall
delay time, wherein each of the plurality of communication devices is configured to:
initiate the respective one of each of the plurality of
main radios at the respective one of each of the
plurality of initiation times, respectively, and
communicate with the communication node using
the respective one of each of the plurality of main
radios during the respective one of each of the
plurality of device active times.

2. The method of claim 1, wherein the node active time is a window of time.

3. The method of claim 1, wherein the node active time is a point in time.

4. The method of claim 1, comprising:
extracting an indicator from the wake up signal; and
retrieving the node active time from a data store based on the indicator.

5. The method of claim 1, wherein the wake up signal comprises the node active time.

6. The method of claim 1, wherein the first main radio is asleep at the receipt time.

7. The method of claim 1, wherein the wake up signal comprises the overall delay time.

8. The method of claim 1, wherein the node active time is a period of time after the receipt time.

9. The method of claim 1, wherein the receipt time is at an end of the wake up signal.

10. A method comprising:
sending a wake up signal to a wake up radio of a
communication device for receipt at a receipt time,
wherein the wake up signal indicates a node active time
for a plurality of main radios of a plurality of communication devices to begin communicating with the
communication node, wherein each of the plurality of
communication devices is configured to:
determine a respective one of each of a plurality of
transition times between a respective one of each of
a plurality of initiation times and a respective one of
each of a plurality of device active times for a
respective one of each of the plurality of main radios,
wherein the plurality of device active times are
during the node active time and at least two transition times of the plurality of transition times are
different, wherein the wake up signal comprises an
overall delay time from the receipt time to the node
active time, wherein the overall delay time is the
same for each of the plurality of main radios and
indicates a time when each of the plurality of main
radios is ready to send uplink data to the communication node, and the overall delay time is greater than
or equal to a maximum transition time of the plurality of transition times, and
determine a respective one of each of a plurality of
device delay times between the receipt time and each
of the plurality of initiation times, such that a sum of
the respective one of each of the plurality of device
delay times and the respective one of each of the
plurality of transition times is equal to the overall
delay time, wherein each of the plurality of communication devices is configured to:
initiate the respective one of each of the plurality of
main radios at the respective one of each of the
plurality of initiation times, respectively; and
communicating with each of the plurality of main radios
during the node active time.

11. The method of claim 10, wherein the node active time is a window of time.

12. The method of claim 10, wherein the node active time is a point in time.

13. The method of claim 10, wherein the wake up signal configures the communication device to:
extract an indicator from the wake up signal; and
retrieve the node active time from a data store based on the indicator.

14. The method of claim 10, wherein the wake up signal comprises the node active time.

15. The method of claim 10, wherein the first main radio is asleep at the receipt time.

16. The method of claim 10, wherein the wake up signal comprises the overall delay time.

17. A system, comprising:
a plurality of communication devices, wherein the plurality of communication devices comprises a first communication device, wherein the first communication
device comprises:
a receiver configured to receive a wake up signal at a
wake up radio from a communication node at a
receipt time, wherein the wake up signal indicates a
node active time for a plurality of main radios of the
plurality of communication devices to begin communicating with the communication node, wherein
each of the plurality of communication devices comprises at least one processor coupled to a respective
one of each of a plurality of receivers, wherein the at
least one processor in each of the plurality of communication devices is configured to:
determine a respective one of each of a plurality of
transition times between a respective one of each of
a plurality of initiation times and a respective one of
each of a plurality of device active times for a
respective one of each of the plurality of main radios,
wherein the plurality of device active times are
during the node active time and at least two transition times of the plurality of transition times are
different, wherein the wake up signal comprises an
overall delay time from the receipt time to the node
active time, wherein the overall delay time is the
same for each of the plurality of main radios and
indicates a time when each of the plurality of main
radios is ready to send uplink data to the communication node, and the overall delay time is greater than
or equal to a maximum transition time of the plurality of transition times; and
determine a respective one of each of a plurality of
device delay times between the receipt time and each
of the plurality of initiation times, such that a sum of
the respective one of each of the plurality of device
delay times and the respective one of each of the
plurality of transition times is equal to the overall
delay time, wherein each of the plurality of communication devices is configured to:
initiate the respective one of each of the plurality of
main radios at the respective one of each of the
plurality of initiation times, and
communicate with the communication node using
the respective one of each of the plurality of main radios during the respective one of each of the plurality of device active times.

18. The system of claim 17, wherein the node active time is a window of time.

* * * * *